March 11, 1952     A. M. MIERS     2,588,645
BRAKE BEAM BALANCING LINK
Filed Sept. 30, 1949
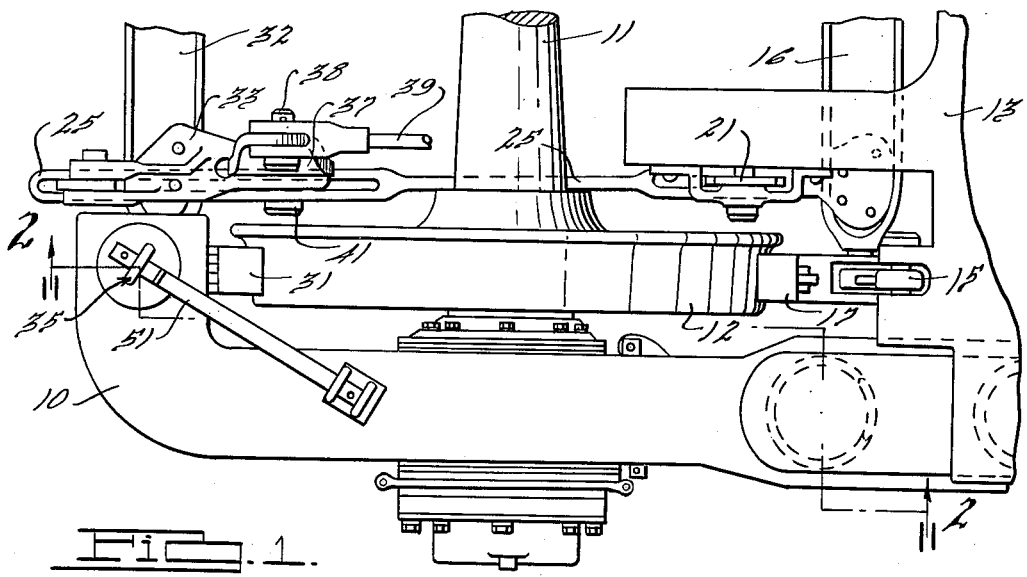
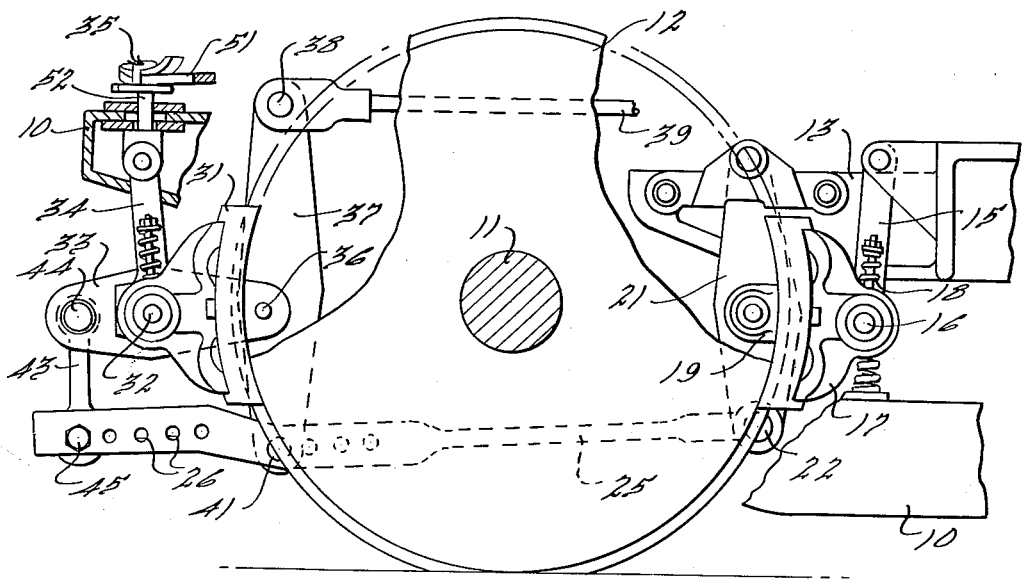
INVENTOR.
Archie M. Miers.
BY
Harness and Harris
ATTORNEYS.

Patented Mar. 11, 1952

2,588,645

UNITED STATES PATENT OFFICE 2,588,645

BRAKE BEAM BALANCING LINK

Archie M. Miers, Croton-on-Hudson, N. Y., assignor to Chrysler Corporation, Highland Park, Mich., a corporation of Delaware Application September 30, 1949, Serial No. 118,739

2 Claims. (Cl. 188—212)

This invention relates to a brake beam balancing link and more particularly to a balancing link adapted to be associated with a so-called "floating" lever of a brake beam actuating mechanism.

It is a primary object of this invention to provide a simplified form of brake beam balancing device that will positively support the floating linkage of the brake beam actuating rigging and also counteract the tendencies of the "floating" brake beam actuating linkage to move the brake beam and the associated brake rigging to positions where it will be improperly positioned to satisfactorily accomplish its intended functions.

It is a further object of this invention to provide a brake beam balancing linkage for a floating lever type of brake rigging that will improve the braking action of the railway truck brake rigging due to the balancing linkage furnishing a controlled movable support for the lever.

It is an additional object of this invention to provide a brake beam balancing link for a floating lever type of brake rigging wherein the balancing link positively supports the associated rigging linkage in its intended positions and thus prevents wear and damage to the rigging that might otherwise result from uncontrolled movement of the floating beam actuating linkage.

Other objects and advantages of this invention will become apparent from a reading of the specification and a consideration of the relating drawings wherein:

Fig. 1 is a fragmentary plan view of an end portion of one side of a railway truck having wheel brake rigging embodying this invention; and Fig. 2 is a fragmentary side elevational view taken along the line 2—2 of Fig. 1, certain portions being broken away for the sake of clarity.

In the figures of the drawing the numeral 10 is applied to the end portions of a railway truck side frame. The truck side frame 10 is adapted to be supported on the axle 11 which carries the usual wheels 12 at the opposite ends thereof. Side frame 10 is adapted to resiliently support the load carrying transom frame 13 in a manner well-known in the art. Transom frame 13 has pivotally mounted thereon a brake beam hanger link 15. The swingable end of link 15 rotatably supports one end of the inner brake beam 16. On each end of beam member 16 there is rotatably mounted a conventional brake head 17. Head 17 is adapted to be moved into and out of engagement with the rolling surface of the wheel 12 as a result of the operation of the brake actuating linkage to be hereinafter described. A suitable spring loaded friction element 18 carried by the beam 16, is arranged so as to have portions thereof engaged with the head 17 to frictionally restrain relative rotation between the head 17 and the beam 16. Also pivotally connected to the transom frame 13 and depending therefrom is a lever 21. Intermediate its ends the lever 21 is connected to the end portion of a yoke 19 carried by the brake beam 16. The depending swingable end of lever 21 has connected thereto at 22 one end of a connecting link 25 which link is more fully described in the subsequent description of the brake beam actuating mechanism.

The brake head 31 associated with the brake beam at the outer side of the truck wheel 12 is pivotally mounted on the end portion of the outer brake beam 32 in a manner similar to that described with respect to the connection between brake head 17 and inner brake beam 16. Brake beam 32 is pivotally supported from the side frame 10 by means of the pivoted hanger link 34. Hanger 34 is mounted on the side frame 10 by means of a shock absorbing hanger suspension device 35 which device is disclosed in detail in the co-pending application of Archie M. Miers, Serial No. 61,805, filed November 24, 1948. Briefly this device includes the spring member 51 that resiliently carries the flanged hanger support 52 at all times when the brakes are not being applied. On application of the brakes the hanger 52 will be moved vertically by the brake reaction and one of the flanges of the hanger support 52 will engage the frame member 10 to provide a rigid reaction member for braking. Hanger support 52 has a yoke formation at its lower end to which is pivotally connected the brake beam hanger 34. Beam 32 has mounted thereon, adjacent each end, a yoke member 33. Yoke 33 is pivotally connected at 36 to the intermediate portion of a vertically disposed, "floating," brake beam actuating lever 37. The upper end of lever 37 is pivotally connected at 38 to one end of the brake beam actuating link 39. Link 39 is adapted to be reciprocated by any form of conventional pressure-operated motor (not shown). The lower end of lever 37 is pivotally connected at 41 to an intermediate portion of the connecting link 25.

The brake beam balancing link 43 embodying this invention is pivotally connected at 44 to the outer end of the brake beam yoke member 33. Balancing link 43 is also pivotally connected at 45 to the outwardly extending end of the connecting link 25. Link 25 is provided with a plurality of pivot pin openings 26 to permit adjustment of the several link connections.

With the brake rigging herein disclosed it is obvious that the "floating" beam actuating lever 37 has a tendency, due to its unsupported weight, to impose a downwardly directed load on the inner end of the brake beam yoke 33. This load of the floating lever 37 and its associated linkage tends to rotate the brake beam 32 on its hanger member 34 and if unrestrained this rotation of the brake beam will rock the brake head 31 into engagement with the associated wheel so as to develop a drag on the wheel that will cause unnecessary wear of the brake shoe. In addition, it is thought to be obvious that a brake rigging employing a floating lever similar to lever 37 is a relatively unstable arrangement unless some form of brake beam balancing mechanism is used. The weight of the lever 37 and its associated linkage will continually urge it downwardly towards the track rails while vibrations of the side frame transmitted to the beam yoke 33 through the hanger suspension 35 will tend to cause the lever 33 to oscillate in a vertical plane. Unless some means is provided to stabilize the movement of the lever 37, the lever 37 and its associated members are vibrated unnecessarily and wear of the elements associated with the lever 37 is greatly accelerated. Various types of springs and links connected between the side frame 10 and the beam yoke 33 have been tried as beam stabilizing links but these constructions all have the inherent defect of transmitting the frame vibrations and producing turning moments that rock the brake beam unnecessarily.

To permit the use of a so-called floating brake actuating lever, such as the lever 37, and still prevent the aforedescribed uncontrolled movement of the brake beam and its associated parts, the brake beam balancing link 43 is added to the brake rigging in the manner herein disclosed. The incorporation of the balancing link 43 in the beam actuating linkage in the manner herein disclosed provides a parallelogram type of actuating lever movement controlling device that permits the brake rigging to operate in its intended manner and at the same time the balancing link 43 positively supports and controls the movement of the so-called "floating" actuating linkage 37. The various disadvantages of the "floating" linkage due to the gravitational effects of the unsupported "floating" lever 37 are completely eliminated by this construction. By opposing the downward movement of the lever 37, the balancing link 43 maintains the lever 37 in a supported position where it is most effective to transmit the brake operating forces and where it will not interfere with the operation of other elements of the truck.

I claim:

1. In a railway truck brake rigging, a frame member, a brake beam hanger depending from and pivotally connected to said frame member, a brake beam mounted on said hanger for rotation about a horizontally disposed axis, a horizontally disposed yoke member carried by said beam arranged to extend transversely of and to project from opposite sides of the rotational axis of said beam, a vertically disposed floating lever for actuating said brake beam having a portion intermediate the ends thereof pivotally connected to the yoke member on one side of the brake beam rotational axis, actuating means for said floating lever connected to the upper end thereof, a horizontally disposed, rigid connecting link pivotally connected to the lower end of said floating lever, and a rigid, brake beam balancing link pivotally connected to and depending from the yoke member on the other side of the brake beam rotational axis and to said connecting link, said connected yoke member, balancing link, connecting link and floating lever providing a parallelogram linkage to support and control the movement of the floating lever.

2. In a brake rigging for a railway car truck comprising a truck frame and a supporting wheel, the combination of a brake beam hanger depending from and pivotally supported on said frame, a horizontally disposed brake beam rotatably mounted on said hanger having a vertically disposed brake head adapted to be engaged with said wheel, said brake beam also including rigid portions that extend transversely to and project outwardly from opposite sides of the rotational axis of said beam, a balancing link pivotally connected to and depending from a transversely extending beam portion on one side of the beam rotational axis, a vertically disposed brake beam actuating lever having a portion intermediate the ends thereof pivotally connected to a transversely extending beam portion located on the other side of the beam rotational axis, said brake beam actuating lever having the end portions thereof extending above and below said beam, a rigid link means pivotally connecting portions of the balancing link and the brake beam actuating lever that depend below the brake beam, and operating means for the brake beam actuating lever connected to the portion of the brake beam actuating lever extending above the brake beam, the transversely extending brake beam portions, the balancing link, the brake beam actuating lever and the link connecting the balancing link and brake beam actuating lever being arranged to provide a beam movement controlling linkage of parallelogram construction.

ARCHIE M. MIERS.

REFERENCES CITED

The following references are of record in the file of this patent:

UNITED STATES PATENTS

| Number | Name | Date |
|---|---|---|
| 1,221,938 | Williams | Apr. 10, 1917 |
| 1,504,281 | Streib | Aug. 12, 1924 |
| 2,135,438 | Baselt | Nov. 1, 1938 |